(12) United States Patent
Li et al.

(10) Patent No.: US 8,467,392 B2
(45) Date of Patent: Jun. 18, 2013

(54) METHOD AND SYSTEM FOR DATA TRANSMISSION

(75) Inventors: Bojie Li, Shanghai (CN); Chenghui Peng, Shanghai (CN); Yuhua Chen, Shanghai (CN); Wei Zhang, Shanghai (CN); Hong Li, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/425,970

(22) Filed: Mar. 21, 2012

(65) Prior Publication Data

US 2012/0182995 A1 Jul. 19, 2012

Related U.S. Application Data

(63) Continuation of application No. PCT/CN2010/077190, filed on Sep. 21, 2010.

(30) Foreign Application Priority Data

Sep. 24, 2009 (CN) .......................... 2009 1 0174101

(51) Int. Cl.
*H04L 12/56* (2006.01)
*H04L 12/54* (2006.01)

(52) U.S. Cl.
USPC ........................ 370/392; 370/389; 370/395.31

(58) Field of Classification Search
None
See application file for complete search history.

(56) References Cited

U.S. PATENT DOCUMENTS

| | | | |
|---|---|---|---|
| 7,849,199 B2 * | 12/2010 | Schulz et al. | 709/228 |
| 2001/0049286 A1 * | 12/2001 | Hansmann et al. | 455/435 |
| 2002/0101975 A1 | 8/2002 | Tiburtius et al. | |
| 2003/0027581 A1 * | 2/2003 | Jokinen et al. | 455/456 |
| 2005/0083883 A1 * | 4/2005 | Ho et al. | 370/331 |
| 2005/0213591 A1 | 9/2005 | Nakazawa et al. | |
| 2007/0243876 A1 * | 10/2007 | Duan | 455/445 |
| 2009/0049202 A1 * | 2/2009 | Pattison et al. | 709/249 |
| 2009/0133110 A1 * | 5/2009 | Kumar et al. | 726/8 |
| 2009/0170519 A1 * | 7/2009 | Wilhoite et al. | 455/436 |

FOREIGN PATENT DOCUMENTS

| | | |
|---|---|---|
| CN | 1424834 A | 6/2003 |
| CN | 1674577 A | 9/2005 |
| CN | 1941739 A | 4/2007 |
| EP | 1 379 037 A1 | 1/2004 |

OTHER PUBLICATIONS

International Search Report mailed Dec. 30, 2010, for related PCT Patent Application No. PCT/CN2010/077190.
Written Opinion of the International Searching Authority mailed Dec. 30, 2010, for related PCT Patent Application No. PCT/CN2010/077190.

(Continued)

*Primary Examiner* — Hanh N Nguyen
*Assistant Examiner* — Joshua A Kading
(74) *Attorney, Agent, or Firm* — Slater & Matsil, L.L.P.

(57) ABSTRACT

A method for data transmission includes: a router receives a data packet sent by an access device of a first user, where the data packet carries target device selection information including at least a user identity of a second user, and the user identity is associated with at least one access device of the second user; the router obtains a routing address of an optimal access device among access devices associated with the user identity; and the router sends the data packet to the optimal access device according to the routing address.

21 Claims, 12 Drawing Sheets

OTHER PUBLICATIONS

Moskowitz et al., "Host Identity Protocol (HIP) Architecture,"RFC 4423, The Internet Society, May 2006.

Moskowitz et al., "Host Identity Protocol," RFC 5201, The Internet Society, Apr. 2008.

Jokela, et al., "Using the encapsulating Security Payload (ESP) Transport Format with the Host Identity Protocol (HIP)," RFC 5202, The Internet Society, Apr. 2008.

Laganier, et al., "Host Identity Protocol (HIP) Registration Extension," RFC 5203, The Internet Society, Apr. 2008.

Laganier, et al., "Host Identity Protocol (HIP) Rendezvous Extension," RFC 5204, The Internet Society, Apr. 2008.

Nikander et al., "Host Identity Protocol (HIP) Domain Name System (DNS) Extension, " RFC 5205, The Internet Society, Apr. 2008.

Nikander et al., "End-Host Mobility and Multihoming with the Host Identity Protocol," RFC 5206, The Internet Society, Apr. 2008.

Henderson, et al., "Using the Host Identity Protocol with Legacy Applications," RFC 5338. The Internet Society, Sep. 2008.

\* cited by examiner

METHOD AND SYSTEM FOR DATA TRANSMISSION

CROSS-REFERENCE TO RELATED APPLICATIONS

This application is a continuation of International Application No. PCT/CN2010/077190, filed on Sep. 21, 2010, which claims priority to Chinese Patent Application No. 200910174101.X, filed on Sep. 24, 2009, both of which are hereby incorporated by reference in their entireties.

FIELD OF THE INVENTION

The present invention relates to network communications technologies, and in particular, to a method and a system for data transmission.

BACKGROUND OF THE INVENTION

On the current Internet (Internet), the Internet Protocol (Internet Protocol, IP) address has double semantics, a locator (Locator) and an identifier (Identifier). The locator is used to indicate the topological location of a host on a network, and the identifier is used to indicate the identity of the host. With the increase of Internet users, rapid development of wireless networks, and increasing communication requirements of people, the practice of coupling the locator and identifier in the IP address leads to some problems, for example, the practice is disadvantageous to network layering and hinders the mutual access of hosts in different network coverage areas. Another serious problem is that using the IP address as the identifier does not support mobility well. However, with the tremendous development of current mobile communication, combining the mobile communication and the Internet will become an inevitable development trend of communication in the future. The Host Identity Protocol (Host Identity Protocol, HIP) is a solution for splitting the double semantics of the IP address. HIP introduces a host identity layer between a Transport Control Protocol (Transport Control Protocol, TCP) layer and an IP layer, and uses the host identity (Host Identity, HI) to identify a user. However, the IP address of the IP layer is only used for routing at a network layer, that is, the IP address reserves only the locator semantic, and the identifier semantic is represented by the HI of the HIP layer.

The HIP is used to identify the host; however, the final user of network communication is the user; in the case of inter-user communication, a user may pay less attention to the specific location of a peer user and devices used by the peer user, but pay more attention to who the peer user is. Therefore, using the host as the identifier cannot support a user-centered communication mode in the future.

SUMMARY OF THE INVENTION

Embodiments of the present invention provide a method and system for data transmission to solve a problem in the prior art that a user-centered communication mode is not supported.

An embodiment of the present invention provides a method for data transmission, including:

receiving, by a router, a data packet sent by an access device of a first user, where the data packet carries target device selection information including at least a user identity of a second user, and the user identity is associated with at least one access device of the second user;

obtaining, by the router, a routing address of an optimal access device among access devices associated with the user identity; and sending, by the router, the data packet to the optimal access device according to the routing address.

An embodiment of the present invention provides a system for data transmission, including a router, where the router includes:

a receiving module, configured to receive a data packet sent by an access device of a first user, where the data packet carries target device selection information including at least a user identity of a second user, and the user identity is associated with at least one access device of the second user;

an obtaining module, configured to obtain a routing address of an optimal access device among access devices associated with the user identity; and a sending module, configured to send the data packet to the optimal access device according to the routing address.

According to the technical solutions provided in embodiments of the present invention, the user identity of the second user is carried to implement user-centered communication.

DETAILED DESCRIPTION OF THE EMBODIMENTS

Figure 1:
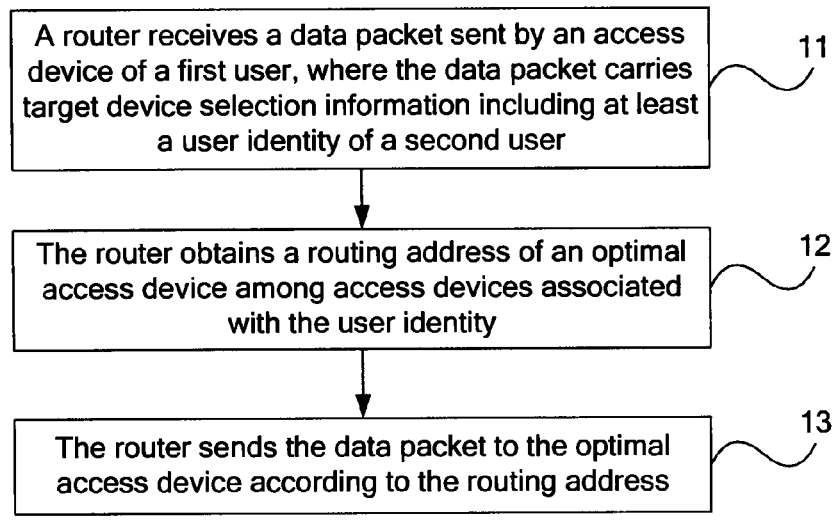
FIG. 1 is a schematic flowchart of a method according to a first embodiment of the present invention.

FIG. 1 is a schematic flowchart of a method according to a first embodiment of the present invention. The method includes the following steps:

Step 11: A router receives a data packet sent by an access device of a first user, where the data packet carries target device selection information including at least a user identity of a second user, and the user identity is associated with at least one access device of the second user.

To implement a user-centered communication mode, a user identity (User Identity, UI), rather than an IP address or a host identity, is used as an identity in this embodiment.

Figure 2:
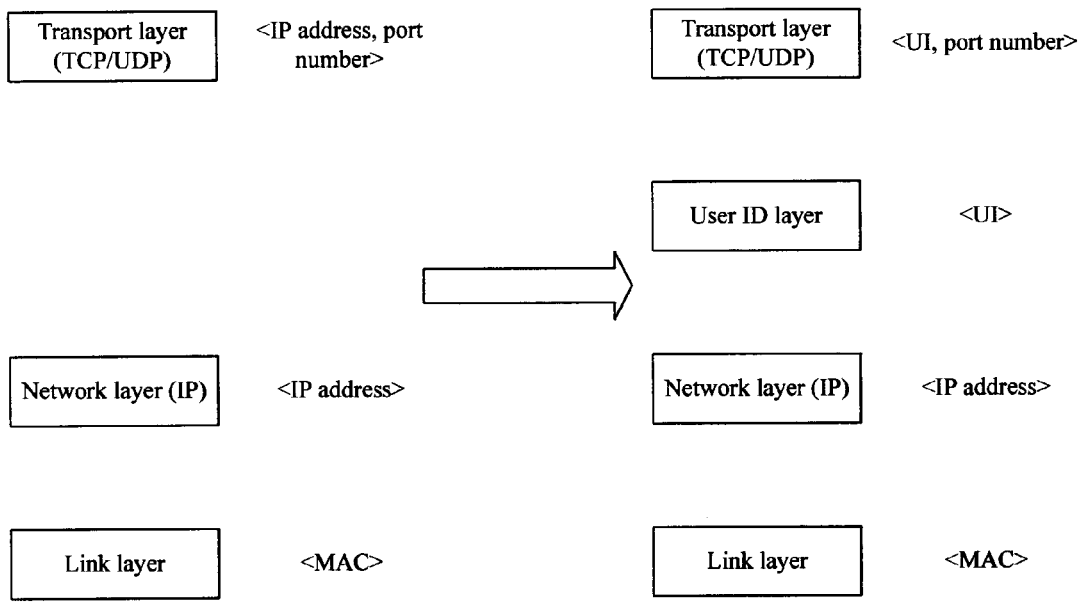
FIG. 2 is a schematic diagram of a protocol stack used in all embodiments of the present invention.

FIG. 2 is a schematic diagram of a protocol stack used in all embodiments of the present invention. As shown in FIG. 2, in the embodiments of the present invention, a user identity layer is added on the basis of an existing protocol stack (a communication protocol stack that complies with an OSI 7-layer reference model or a TCP/IP protocol stack or a protocol stack that implements similar functions). The user identity layer may be lower than a transport layer. Specifically, the user identity layer and a network layer may be located at the same layer. For example, a part of an IPv6 address field is used as a user identity field, and the user identity field is filled with a user identity, or the user identity layer may also be lower than the transport layer but higher than the network layer, that is, a new layer is added between the transport layer and the network layer (as shown in FIG. 2). In the embodiments of the present invention, a user identity layer is added; a source user identity and a destination user identity are added to a header of a transmitted data packet to identify a user identity; a source address and a destination address that are carried in the header of the data packet have a routing function (that is, used as a routing address) instead of a function of identifying an identifier in the embodiments of the present invention.

In a network system provided in embodiments of the present invention, each user has access devices associated with its own user identity, a home location server, and a home router. The access device is used to connect a user to a network. One user may have multiple access devices (for example, a mobile phone, a computer and the like). In service data transmission, each user may determine an optimal access device among multiple access devices to perform service interaction. A manner for determining an optimal access device may vary according to different actual conditions. The home router is mainly used for forwarding data packets. The home location server is mainly used for managing context information of users, and providing services such as query, selection, subscription, and push. For example, when a user accesses a network through an access device, the access device or an entity on the network accessed by the access device needs to register with a home location server and provide the routing address, capability, state, and attribute of the access device and the capability and attribute of a network to which the access device belongs. When such information is changed, the access device or the entity on the network accessed by the access device needs to register with the home location server of the user or update the information on the home location server of the user. In addition, the home location server may maintain user related policy information (for example, tariff preferred and quality preferred), surrounding environment information of the user (for example, home environment or office environment), and data type or session information (data type/session information) of a current service of the user. When the user formulates or updates related policy of the user, the user needs to register or update (register/update) with the home location server of the user. The surrounding environment information of the user may be obtained indirectly through the device routing address and state of an access device associated with the user identity or may also be obtained through the active indication of the user. The data type or session information of the current service of the user may be obtained through a received query request or subscription message. The user identity, the routing address, capability, state, and attribute of the access device associated with the user identity, the capability and attribute of a network accessed by the access device, the user related policy, surrounding environment information of the user, data type or session information of the current service of the user, and the like may be a part of a user context. The home location server may be deployed on a home network of a certain device of the user or on a third party network. The definition of the home router, home location server, and user context are applicable to all embodiments of the present invention.

Step 12: The router obtains a routing address of an optimal access device among access devices associated with the user identity.

It may be that: when the router has stored a mapping relationship between target device selection information and the routing address of the optimal access device, the router determines the routing address of the optimal access device corresponding to the target device selection information according to the mapping relationship, where the routing address of the optimal access device in the mapping relationship is obtained from a home location server of the second user in advance.

When the router has not stored the mapping relationship between the target device selection information and the routing address of the optimal access device, the router obtains the routing address of the optimal access device from the home location server of the second user. The target device selection information provided in the embodiments of the present invention may be the user identity of the second user or the target device selection information may also be the user identity of the second user and data type/session information of a current service. In the former case, an optimal access device is determined for the second user, and data type/session information of current services of the second user corresponds to the same device no matter whether the data type/session information of current services of the second user is the same or not. In the latter case, an optimal access device is determined according to the second user and the data type/session information, and different data type/session information of current services corresponds to different optimal access devices even if the second user is the same.

Step 13: The router sends the data packet to the optimal access device according to the routing address.

A whole network may be divided into multiple domains, and each domain has at least one ingress/egress domain router which is used in the data ingress/egress domain. A location server may also be deployed in each domain to register the location and context information of a device. Different access devices associated with the user identity may be located in a same network domain or in different network domains.

Figure 3:
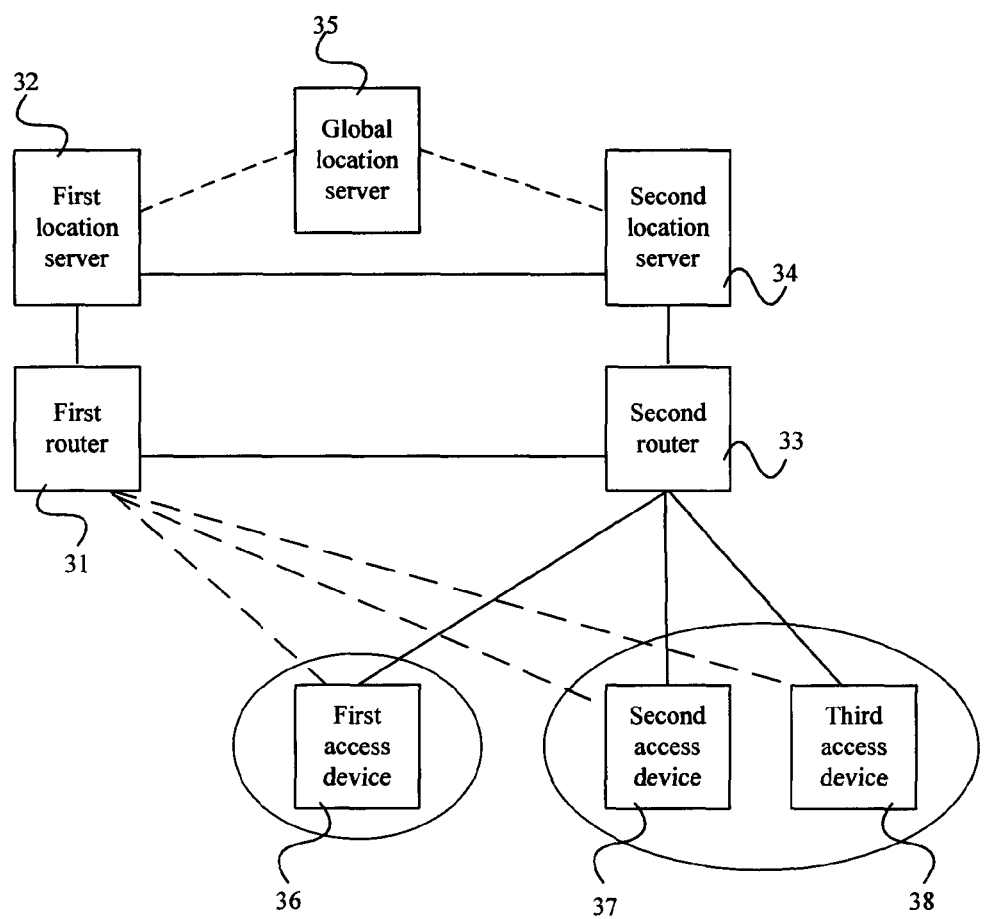
FIG. 3 is a schematic structural diagram of a network system used in all embodiments of the present invention.

FIG. 3 is a schematic structural diagram of a network system used in all embodiments of the present invention. The network system includes an ingress/egress domain router (first router) 31 in a network domain accessed by an access device of a first user, a location server (first location server) 32 in the network domain accessed by the access device of the first user, a home router (second router) 33 of a second user, and a home location server (second location server) 34 of the second user. The network system may further include a global location server 35 configured to manage a mapping relationship between a user identity and a home location server or a home router globally. Access devices associated with the user identity of the second user may be multiple, for example, a first access device 36, a second access device 37, and a third access device 38 of the second user shown in FIG. 3. The first access device 36 may be located in a first domain, and the second access device 37 and the third access device 38 may be located in a second domain. A corresponding ingress/egress domain router may also be included in the first domain and the second domain, and a local location server may also be deployed in a corresponding domain.

According to different network deployments, the router provided in the embodiments of the present invention may be the ingress/egress domain router in the network domain accessed by the access device of the first user or the home router of the second user. When the router is the ingress/egress domain router in the network domain accessed by the access device of the first user, the ingress/egress domain router in the network domain accessed by the access device of the first user receives a data packet sent by the access device of the first user. When the router is the home router of the second user, the home router of the second user receives a data packet which is sent by the access device of the first user and is forwarded by the ingress/egress domain router in the network domain accessed by the access device of the first user.

The routing address of an optimal access device may be the globally routable address of the access device or the routing address of the ingress/egress domain router in the network domain accessed by the optimal access device. In the latter case, the ingress/egress domain router needs to maintain a mapping relationship between the user identity and the local address of the access device to address an access device in the domain. The location registration of the access device is triggered by the access device or a network entity in the network domain accessed by the access device in a network access process, and the network entity may be the local location server in the network domain accessed by the access device. In the following embodiments, as an example, the routing address is an IP address.

In a specific scenario, each user correspondingly has a home router, and data or a first data packet sent to the user needs to pass through the home router of the user. An interface exists between the home router of the user and the home location server of the user and is used for exchanging related information.

In this embodiment, a user identity layer is added to a protocol stack, and a user identity at the added user identity layer may be used to implement a user-centered communication mode.

Figure 4:
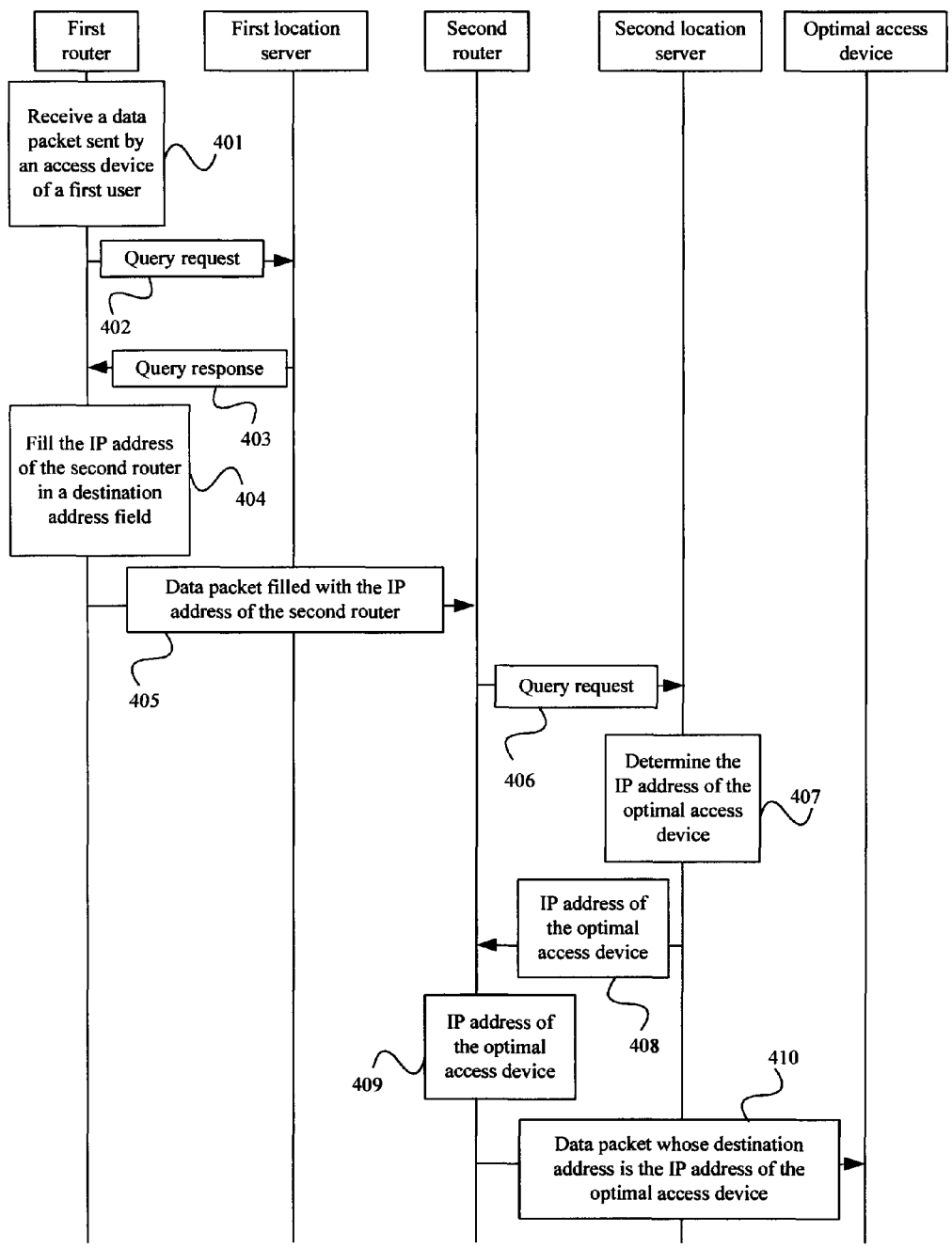
FIG. 4 is a schematic flowchart of a method according to a second embodiment of the present invention.

FIG. 4 is a schematic flowchart of a method according to a second embodiment of the present invention, where the method includes the following steps:

Step 401: A first router receives a data packet sent by an access device of a first user, where the data packet carries a user identity of a second user and a destination address field in the data packet may be null.

Step 402: The first router sends a query request to a first location server, where the query request carries the user identity of the second user.

Step 403: The first location server returns a query response to the first router, where the query response carries an IP address of a second router.

The first location server may store a mapping relationship between the user identity and an address of the router on the first location server itself, or the first location server queries a global location server for the IP address of the second router or the first location server queries a second location server for the IP address of the second router.

Step 404: The first router fills the IP address of the second router in the destination address field of the data packet.

Step 405: The first router sends the data packet filled with a destination address (the IP address of the second router) to the second router.

Step 406: The second router sends a query request to the second location server, where the query request carries the user identity of the second user.

Step 407: The second location server determines the routing address of an optimal access device.

Specifically, the second location server obtains context information of the second user corresponding to the user identity in the information stored on the second location server, and obtains the IP address of the optimal access device of the second user according to the context information of the second user. The context information of the second user may include the routing address, capability, state, and attribute of an access device associated with the user identity of the second user, the capability and attribute of a network accessed by the access device associated with the user identity of the second user, the related policy of the second user, and the surrounding environment information of the second user.

For example, when the user environment of the second user is home (the user environment may be judged according to the mobile phone location of the access device of a user), the access device of the second user includes a mobile phone, a television, and a fixed video phone (the tariff of the television is the lowest), and the policy information of the user is low tariff preferred, the second location server determines the television as the optimal access device of the second user.

Step 408: The second location server sends the IP address of the optimal access device to the second router.

Step 409: The second router replaces the destination address in the data packet with the IP address of the optimal access device.

Step 410: The second router sends the data packet whose destination address is replaced (with the IP address of the optimal access device) to the optimal access device.

In this embodiment, as an example, the second location server determines an optimal access device according to the user identity, and the mapping relationship between the user identity and the routing address of the optimal access device can be obtained according to the embodiment. It is understandable that the data packet in this embodiment may also carry the data type/session information of a current service. In this case, the user identity of the second user and the data type/session information may be carried when the second location server is queried for an optimal access device. Then, the second location server determines an optimal access device according to the user identity of the second user, the data type/session information, and the context information of the second user. This replacement may implement the mapping relationship between the user identity and data type/session information and the routing address of the optimal access device.

In this embodiment, after the second router receives a data packet, the second router queries the second location server for an optimal access device. The method provided in this embodiment may be applied in a scenario where a second router does not have a mapping relationship between target device selection information and an optimal access device; and the target device selection information may be a user identity of a second user, or may also be a user identity of a second user and the data type/session information of a current service. It is understandable that the second router provided in this embodiment may also store the mapping relationship between the routing address of the optimal access device and the target device selection information, where the mapping relationship is obtained from the second location server. Then, when the second router has stored the mapping relationship, the routing address of the optimal access device may be obtained directly according to the mapping relationship stored on the second router, and the second location server does not need to be queried.

In this embodiment, a user-centered communication mode may be implemented by using a user identity. In this embodiment, a second location server determines an optimal access device according to user context information, without the need of interacting with a user, so as to determine the optimal access device quickly.

Figure 5:
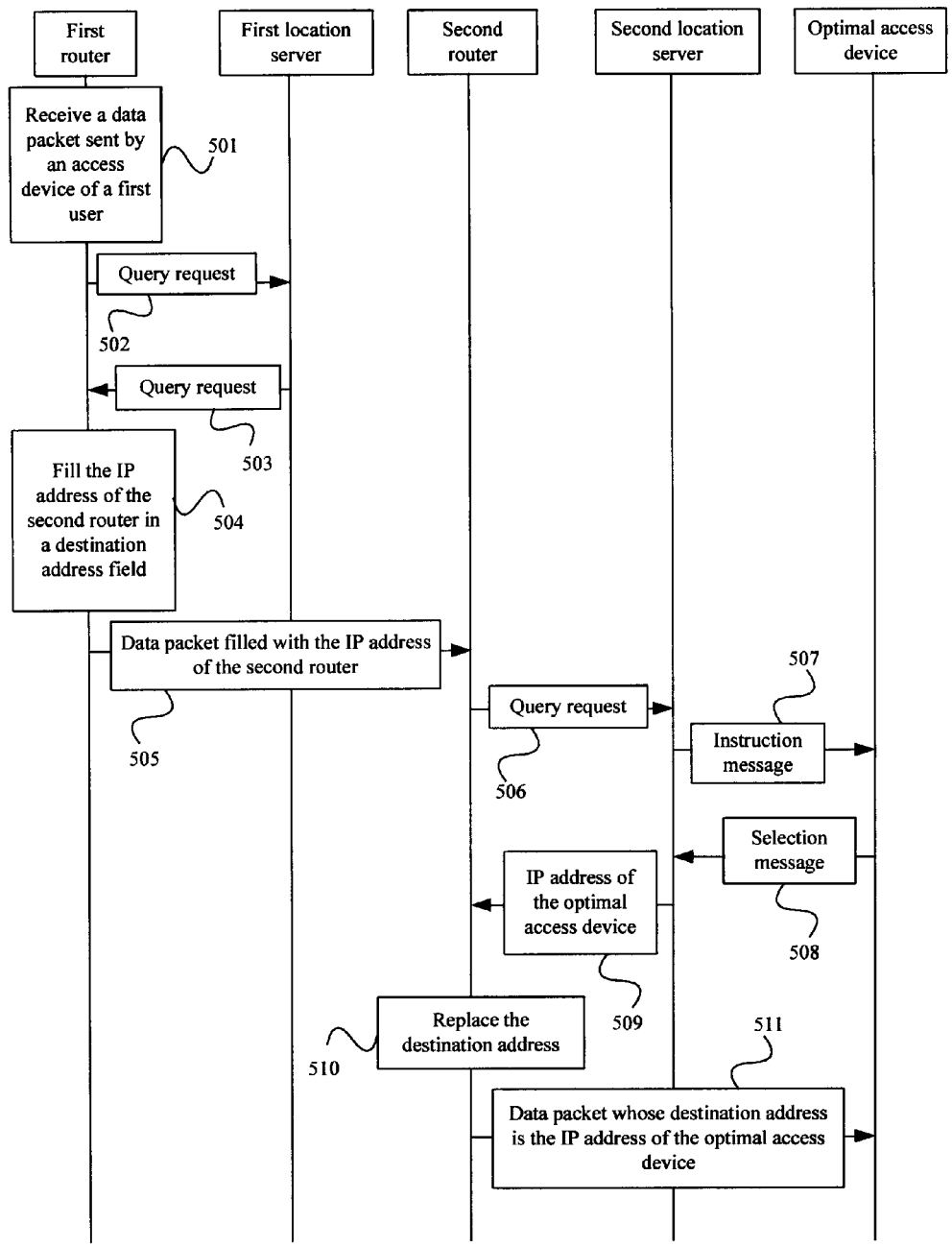
FIG. 5 is a schematic flowchart of a method according to a third embodiment of the present invention.

FIG. 5 is a schematic flowchart of a method according to a third embodiment of the present invention, where the method includes the following steps:

Step 501 to step 506 are correspondingly the same as step 401 to step 406, and are not further detailed.

Step 507: A second location server sends an instruction message to an access device associated with a user identity of a second user, to instruct the second user to select an access device.

Step 508: The second user selects an optimal access device among multiple access devices, and feeds back a selection message to the second location server, where the selection message indicates the access device selected by the second user. The second user may return the selection message through any access device (In FIG. 5, the access device being the optimal access device is taken as an example).

Step 509: The second location server uses the access device that is selected by the second user and is indicated in the selection message as the optimal access device, and sends the IP address of the optimal access device to a second router.

Specifically, the second location server obtains, in the information stored on the second location server, context information of the second user corresponding to the user identity, determines, according to the context information of the second user, the routing address of the access device that returns the selection message, and uses the routing address of the access device that returns the selection message as the routing address of the optimal access device.

Step 510 to step 511 are the same as step 409 to step 410, and are not further detailed.

In this embodiment, the second user determining an optimal access device according to the user identity is taken as an example, and the mapping relationship between the user identity and the routing address of the optimal access device can be obtained according to the embodiment. It is understandable that the data packet in this embodiment may further carry the data type/session information of a current service. In this case, the user identity of the second user and the data type/session information may be carried when the second location server is queried for an optimal access device. Then, when the second location server sends an instruction message to the access device of the second user, the data type/session information may be carried. The second user may select an optimal access device corresponding to the data type/session information, and feed back to the second location server. This replacement may implement the mapping relationship between the user identity and data type/session information and the routing address of the optimal access device.

In this embodiment, after the second router receives a data packet, the second router queries the second location server for an optimal access device. The method provided in this embodiment may be applied in a scenario where a second router does not have a mapping relationship between target device selection information and an optimal access device; and target device selection information may be a user identity of a second user or a user identity of a second user and the data type/session information of a current service. It is understandable that the second router provided in this embodiment may also store the mapping relationship between the routing address of the optimal access device and the target device selection information, where the mapping relationship is obtained from the second location server. Then, when the second router has stored the mapping relationship, the second router can obtain the routing address of the optimal access device directly according to the mapping relationship stored on the second router, and does not need to query the second location server.

In this embodiment, a user-centered communication mode may be implemented by using a user identity. A user can determine an optimal access device, a user requirement can be satisfied, and user participation can be increased.

Figure 6:
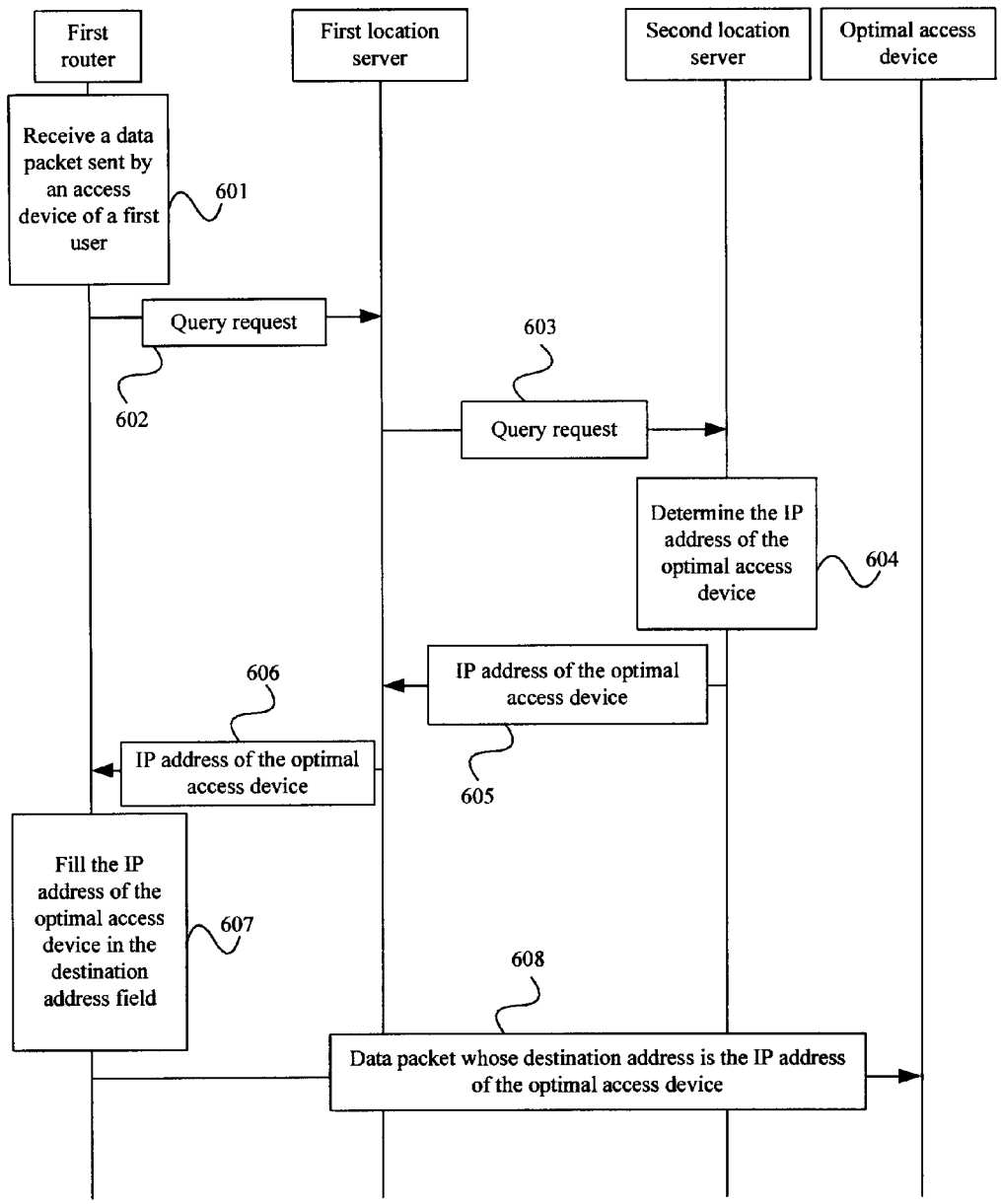
FIG. 6 is a schematic flowchart of a method according to a fourth embodiment of the present invention.

FIG. 6 is a schematic flowchart of a method according to a fourth embodiment of the present invention, where the method includes the following steps:

Step 601 to step 602 are the same as step 401 to step 402, and are not further detailed.

Step 603: A first location server sends a query request to a second location server, where the query request carries a user identity of a second user. The address of a second location server may be obtained through a global location server.

Step 604 is the same as step 407, and is not further described.

Step 605: The second location server sends the IP address of an optimal access device to the first location server.

Step 606: The first location server sends the IP address of the optimal access device to a first router.

Step 607: The first router fills the IP address of the optimal access device in a destination address field of a data packet.

Step 608: The first router sends the data packet where the destination address is filled with (the IP address of the optimal access device) to the optimal access device.

In this embodiment, the second location server determining an optimal access device according to the user identity is taken as an example, and the mapping relationship between the user identity and the routing address of the optimal access device can be obtained according to the embodiment. It is understandable that the data packet in this embodiment may also carry the data type/session information of a current service. In this case, the user identity of the second user and the data type/session information may be carried when the second location server is queried for an optimal access device. Then, the second location server determines an optimal access device according to the user identity of the second user, the data type/session information, and the context information of the second user. This replacement may implement the mapping relationship between the user identity and data type/session information and the routing address of the optimal access device.

In this embodiment, after the second router receives a data packet, the second router queries the second location server for an optimal access device. The method provided in this embodiment may be applied in a scenario where a second router does not have a mapping relationship between target device selection information and an optimal access device; and the target device selection information may be a user identity of a second user, or may be a user identity of a second user and the data type/session information of a current service. It is understandable that the second router provided in this embodiment may also store the mapping relationship between the routing address of the optimal access device and the target device selection information, where the mapping relationship is obtained from the second location server. Then, when the second router has stored the mapping relationship, the routing address of the optimal access device may be obtained directly according to the mapping relationship stored on the second router, and the second location server does not need to be queried.

In this embodiment, a user-centered communication mode may be implemented by using a user identity. In this embodiment, a second location server determines an optimal access device according to user context information, without the need of interacting with a user, to determine an optimal access device quickly. In this embodiment, a data packet is directly sent to the optimal access device without passing through the second router, to speed up the forwarding.

Figure 7:
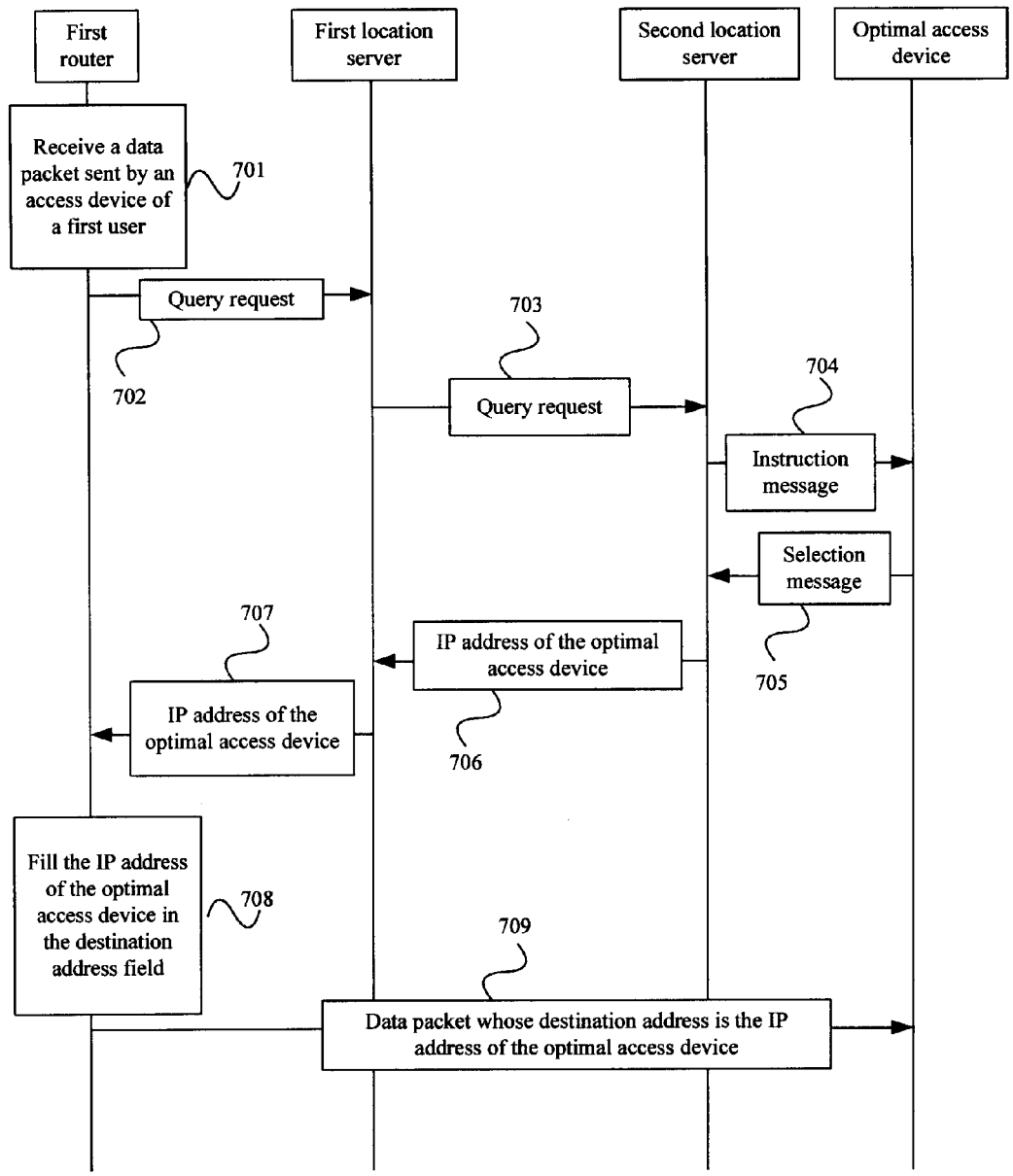
FIG. 7 is a schematic flowchart of a method according to a fifth embodiment of the present invention.

FIG. 7 is a schematic flowchart of a method according to a fifth embodiment of the present invention, where the method includes the following steps:

Step 701 to step 703 are correspondingly the same as step 601 to step 603, and are not further described.

Step 704 to step 705 are correspondingly the same as step 507 to step 508, and are not further described.

Step 706: A second location server uses an access device feeding back the selection message as the optimal access device, and sends the IP address of the optimal access device to a first location server.

Step 707 to step 709 are correspondingly the same as step 606 to step 608, and are not further described.

In this embodiment, the second user determining an optimal access device according to the user identity is taken as an example, and the mapping relationship between the user identity and the routing address of the optimal access device can be obtained according to the embodiment. It is understandable that the data packet in this embodiment may further carry the data type/session information of the current service. In this case, the user identity of the second user and the data type/session information may be carried when the second location server is queried for an optimal access device. Then, when the second location server sends an instruction message to the access device of the second user, the data type/session information may be carried. The second user may select an optimal access device corresponding to the data type/session information, and feed back to the second location server. This replacement may implement the mapping relationship between the user identity and data type/session information and the routing address of the optimal access device.

In this embodiment, after the second router receives a data packet, the second router queries the second location server for an optimal access device. The method provided in this embodiment may be applied in a scenario where a second router does not have a mapping relationship between target device selection information and an optimal access device; and the target device selection information may be a user identity of a second user, or may be a user identity of a second user and the data type/session information of a current service. It is understandable that the second router provided in this embodiment may also store the mapping relationship between the routing address of the optimal access device and the target device selection information, where the mapping relationship is obtained from the second location server. Then, when the second router has stored the mapping relationship, the routing address of the optimal access device may be obtained directly according to the mapping relationship stored on the second router, and the second location server does not need to be queried.

In this embodiment, a user-centered communication mode may be implemented by using a user identity. In this embodiment, by interacting with a user, the user can determine an optimal access device, a user requirement can be satisfied and user participation can be increased. In this embodiment, a data packet is directly sent to the optimal access device without passing through the second router, to speed up the forwarding.

When the context information of the second user is changed, a new optimal access device needs to be determined. In addition, an original optimal access device and the new optimal access device may be the same or different. When the original optimal access device and the new optimal access device are different (that is, when device switching is needed), the first router or the second router needs to acquire a routing address of the new optimal access device. In the following embodiment, the original optimal access device being a first access device and the new optimal access device being a second access device are taken as an example for illustration.

Figure 8:
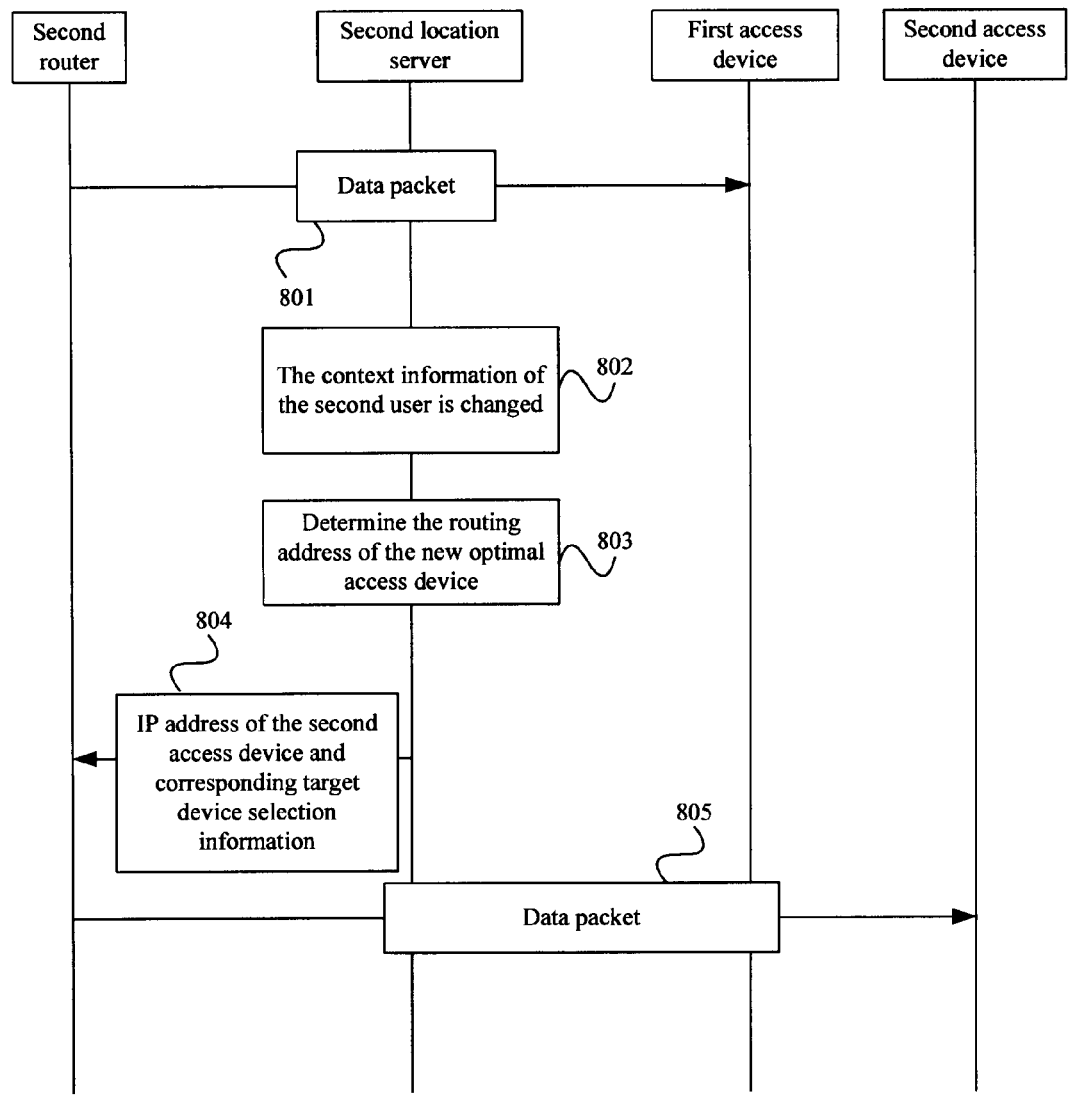
FIG. 8 is a schematic flowchart of a method according to a sixth embodiment of the present invention.

FIG. 8 is a schematic flowchart of a method according to a sixth embodiment of the present invention, where the method includes the following steps:

Step 801: A second router forwards a received data packet to a first access device.

Specifically, reference can be made to the embodiment shown in FIG. 4 or FIG. 5.

Step 802: Context information of a second user is changed.

The changed context information of the second user may include at least one of the following: the routing address, capability, state, and attribute of an access device associated with a user identity of the second user, the capability and attribute of a network accessed by the access device associated with the user identity of the second user, the related policy of the second user, and surrounding environment information of the second user.

The access device of the second user or a network entity on the network accessed by the access device sends new user context registration/update information to a second location server through a registration/update message.

Step 803: The second location server obtains the new context information, and determines the routing address (IP address of a second access device) of a new optimal access device according to the new context information and target device selection information.

A principle for determining a new optimal access device is the same as a principle for determining an optimal access device in the case of initial access of a user. For specific details, reference can be made to the foregoing embodiments (for example, the second location server may determine an optimal access device according to the target device selection information and user context information or the second location server may determine an optimal access device by receiving information of an access device selected by the second user), and details are not further repeated.

Step 804: When device switching exists, the second location server sends the IP address of the second access device and corresponding target device selection information to the second router.

During the implementation, to save signaling, the second location server may send only the routing address of a new access device corresponding to certain specific second user(s) to the second router, or the second location server may send only the routing address of a new access device corresponding to certain specific data type/session information of certain specific second user(s) to the second router. The specific second user(s) or specific data type/session information may be notified to the second location server through an activation state report or a subscription message.

The following modes may be adopted to perform delivering:

Mode 1:

The second location server receives an activation state report that is sent periodically by the second router, where the activation state report is used to indicate whether the target device selection information is in an active state; the second location server sends, to the second router, the routing address of the new optimal access device corresponding to the target device selection information in the active state indicated in the activation state report.

The target device selection information may be the user identity of the second user. In this case, the activation state report is used to indicate whether the second user corresponding to the user identity is in the active state. For example, the second user includes a user B and a user C; if the activation state report indicates that the user B is in an active state while the user C is in an inactive state, the second location server sends the routing address of the new optimal access device of the user B to the second router, but does not send the routing address of the new optimal access device of the user C.

The target device selection information may also be the user identity of the second user and data type/session information of a current service. In this case, the activation state report is used to indicate whether data type/session information corresponding to the user identity is in an active state. For example, the second user includes a user B and a user C, where the user B includes data type/session information B-1, data type/session information B-2, and data type/session information B-3, and the user C includes data type/session information C-1 and data type/session information C-2; if the activation state report indicates that the data type/session information B-1, data type/session information B-2, and data type/session information C-1 are in the active state, the second location server sends routing addresses of new optimal access devices corresponding to the data type/session information B-1, data type/session information B-2, and data type/session information C-1 to the second router, but does not send the routing address of a new optimal access device corresponding to the data type/session information B-3.

Specifically, whether the user or the data type/session information is in the active state may be judged by using the following manner: The activation state report indicates whether the user or data type/session information is in the active state; or if the second location server does not receive the activation state report corresponding to the user or data type/session information within a preset period, it is regarded that the user or the data type/session information is in the inactive state.

Mode 2:

The second location server receives a subscription message sent by the second router, where the subscription message is used to indicate whether the routing address of the optimal access device corresponding to the target device selection information needs to be notified to the second router each time when the optimal access device is changed; the second location server sends, to the second router, the routing address of the new optimal access device that corresponds to the target device selection information as indicated in the subscription message.

Similar to the activation state report, in the mode of the subscription message, the target device selection information may also be a user identity, or a user identity and data type/session information. For example, the subscription message may indicate a subscription to the routing address of the new optimal access device of a user B (rather than a subscription to a user C). Then, the second location server sends the routing address of the new optimal access device of the user B to the second router, and does not send the routing address of the new optimal access device corresponding to the user C.

Certainly, the subscription message may also be cancelled. For example, the subscription to the user B is cancelled, and the second location server will not send the routing address of the new optimal access device that corresponds to the user B to the second router.

The data type/session information may also adopt the subscription mode of the user, and details are not further repeated.

Optionally, when device switching exists, triggering session transfer may be further included. Specifically, an original optimal access device and a new optimal access device are all logical devices, and may be physically located on the same physical device or may be located on different physical devices. When the original optimal access device and the new optimal access device are located on different physical devices, the second location server triggers session transfer from the original optimal access device to the new optimal access device.

Step 805: The second router updates a mapping relationship between the target device selection information and the routing address of the optimal access device, and forwards the data packet to the second access device according to the updated mapping relationship.

In this embodiment, information of a determined new optimal access device is sent to a second router through a second location server, so that a data packet can be switched through the second router.

Figure 9:
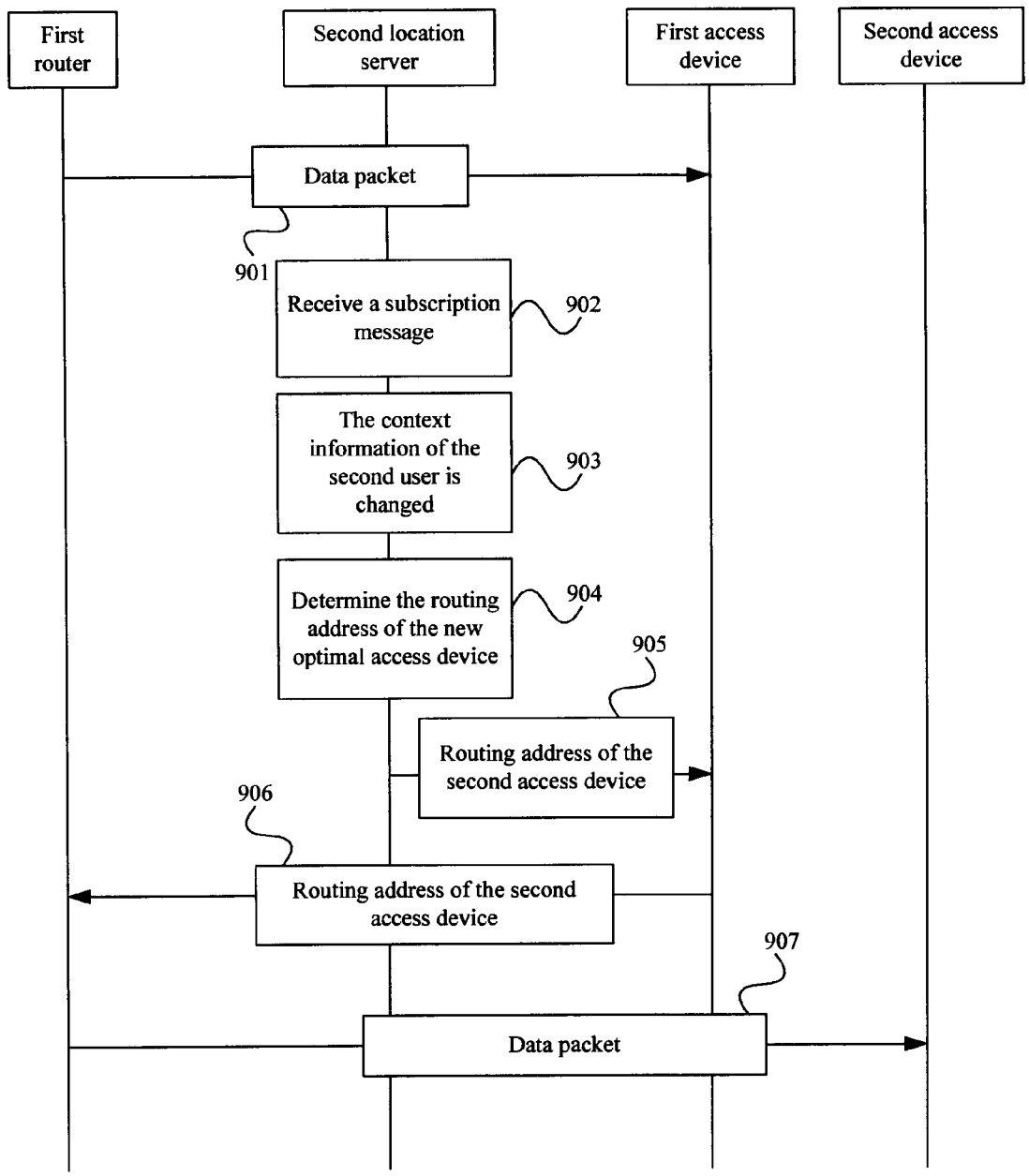
FIG. 9 is a schematic flowchart of a method according to a seventh embodiment of the present invention.

FIG. 9 is a schematic flowchart of a method according to a seventh embodiment of the present invention, where the method includes the following steps:

Step 901: A first router sends a data packet to a first access device.

Specifically, reference can be made to the embodiment shown in FIG. 6 or FIG. 7.

Step 902: A second location server receives a subscription message sent by a subscriber, where the subscriber is an access device of a second user or a network entity on a network accessed by an access device of a second user, where the subscription message carries target device selection information.

For the subscription message, reference can be made to the embodiment shown in FIG. 8. The subscriber may be each access device of the second user, a domain router or a domain location server in each domain to which each access device belongs. Target device selection information carried in the subscription message may be a user identity, or may also be a user identity and a current data type/session of a user. For example, when the target device selection information includes data types/sessions, if the number of data types/sessions is increased, the subscriber needs to add subscriptions to the data types/sessions; if the number of data types/sessions is decreased, the subscriber needs to cancel subscriptions to the decreased data types/sessions. The second location server needs to maintain a current data type/session. When a subscription to a specific data type/session is cancelled, the second location server may not maintain the cancelled data type/session.

Step 903 to step 904 are the same as step 802 to step 803, and are not further described.

Step 905: The second location server sends a routing address of a second access device to the subscriber (illustrated as a first access device in FIG. 9).

Optionally, the second location server may also trigger session transfer from the first access device to the second access device.

Step 906: The subscriber or the second access device in a switching process or an entity on a network accessed by the second access device sends the routing address of the second access device to the access device of the first user or the first router (illustrated as the first router in FIG. 9). For example, the first access device may send the routing address of the second access device and corresponding target device selection information to the first router by using signaling, and the second access device may send the routing address of the second access device and corresponding target device selection information to the first router by using the signaling or reverse data.

Step 907: The access device of the first user or the first router updates a mapping relationship between the target device selection information and the routing address of the optimal access device, and sends the data packet to the second access device according to the updated mapping relationship.

In this embodiment, the information of the new optimal access device is sent to the access device of the first user or the first router, so that the optimal access device can be switched without forwarding the data packet through the second router.

Figure 10:
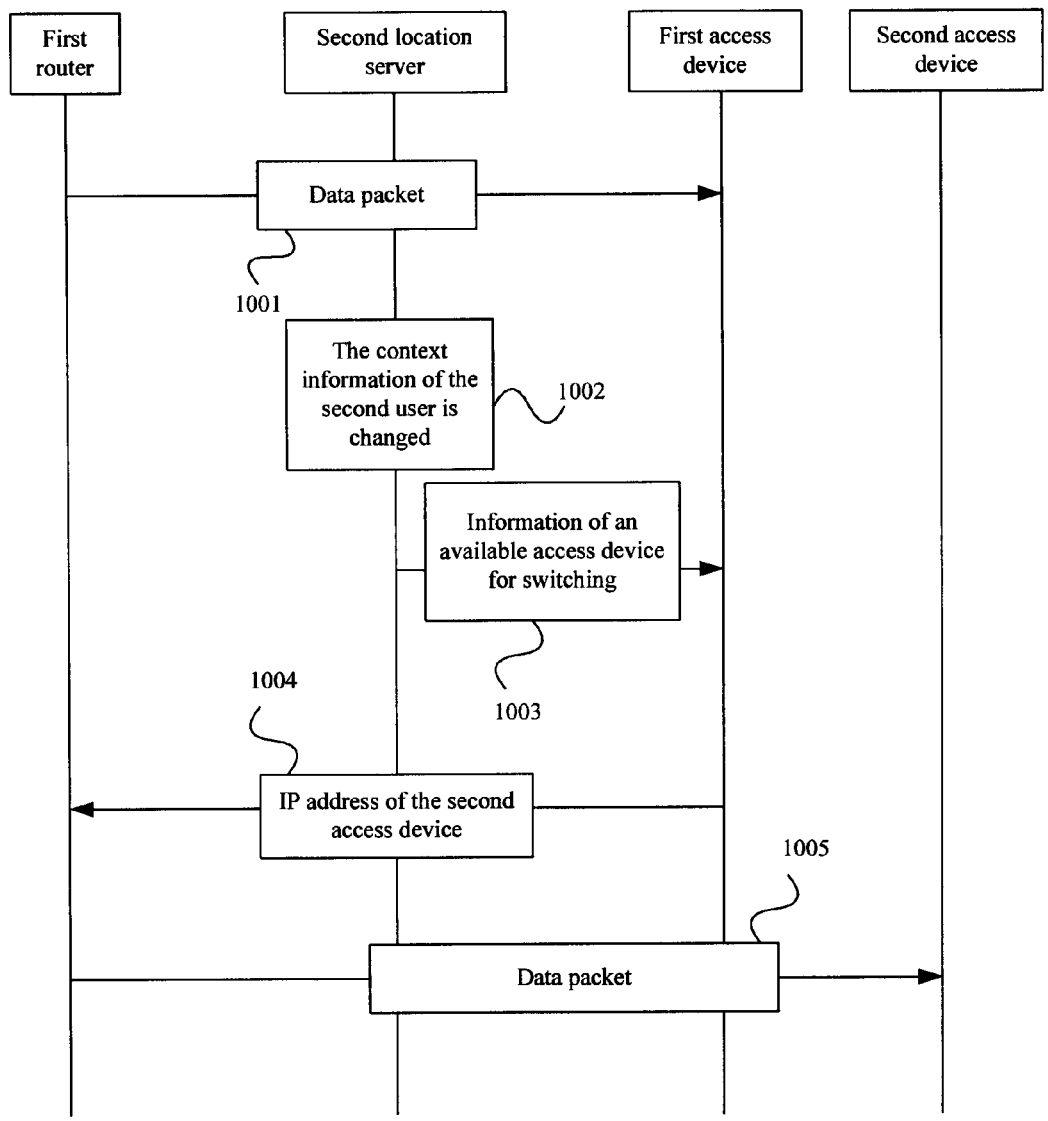
FIG. 10 is a schematic flowchart of a method according to an eighth embodiment of the present invention.

FIG. 10 is a schematic flowchart of a method according to an eighth embodiment of the present invention, where the method includes the following steps:

Step 1001 is the same as step 901, and is not further described.

Step 1002 is the same as step 903, and is not further described.

Step 1003: A second location server pushes information of available access devices that are for current switching and are of a second user to an access device currently used by the second user (illustrated as a first access device in FIG. 10) on a real-time basis, so that the second user selects a new optimal access device (a second access device) corresponding to target device selection information from the available access devices for current switching, and triggers device switching, where the information of the access devices includes one or more of the following: a device type and a device routing address.

Step 1004: A first access device or a second access device sends the routing address (IP address) of the second access device and corresponding target device selection information to the access device of a first user or a first router (illustrated as the first access device in FIG. 10).

For example, the second access device sends the routing address of the second access device to the first router through signaling or reverse data, or after the first access device obtains the routing address of the second access device, the first access device sends the routing address of the second access device to the first router through signaling.

Step 1005: The access device of the first user or the first router updates a mapping relationship between the target device selection information and the routing address of the optimal access device, and sends the data packet to the second access device according to the updated mapping relationship.

In this embodiment, the information of the new optimal access device is sent to the access device of the first user or the first router, so that the optimal access device can be switched without forwarding the data packet through the second router. In this embodiment, a new optimal access device is determined by a user, which may increase the user participation.

Figure 11:
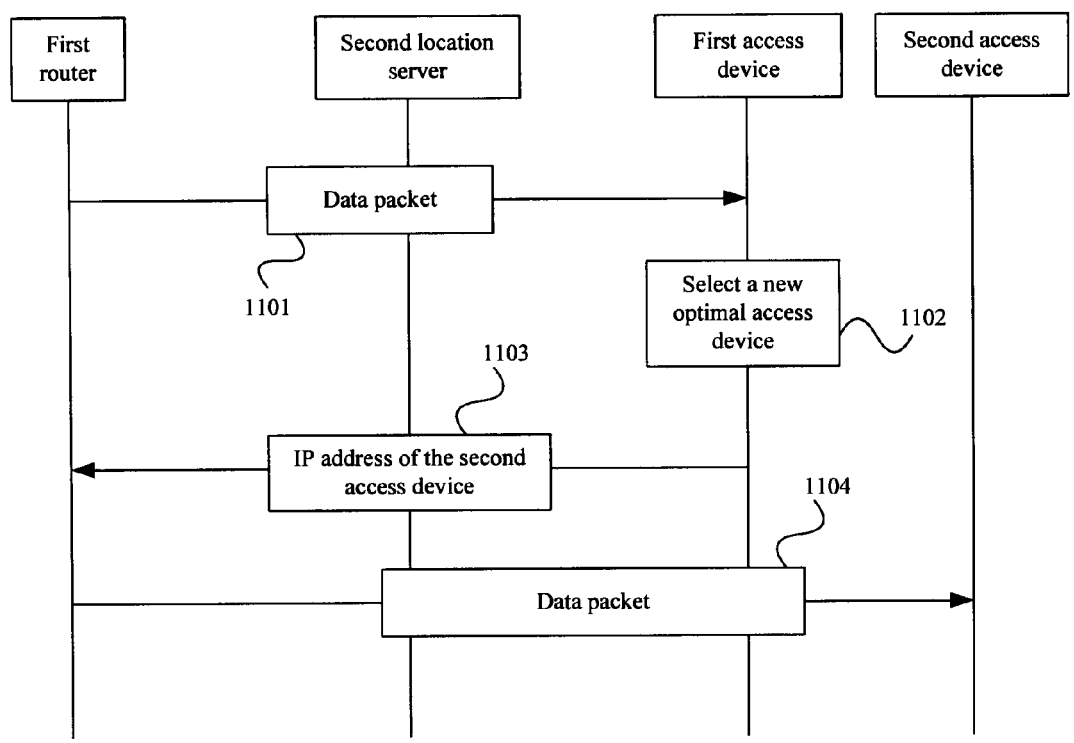
FIG. 11 is a schematic flowchart of a method according to a ninth embodiment of the present invention.

FIG. 11 is a schematic flowchart of a method according to a ninth embodiment of the present invention, where the method includes the following steps:

Step 1101 is the same as step 901, and is not further described.

Step 1102: A second user or an access device of the second user (illustrated as a first access device in FIG. 11) selects a new optimal access device (a second access device) for the second user according to known information, and triggers device switching, where the known information includes one or more of the following: the type of an available device for switching and a device routing address.

For example, the access device of the second user determines a device (a new optimal access device) that is for switching and is of a specific data type/session (service information) or all data types/sessions according to the known information (for example, type, address, and other information of available devices for switching), or the access device of the second user determines a device (a new optimal access device) that is for switching and is of a specific data type/session or all data types/sessions according to the known information and local policy (for example, low tariff preferred in the case of QoS guarantee). Then, the transfer of service session context may be triggered.

Step 1103 to step 1104 are the same as step 1004 to step 1005, and are not further described.

In this embodiment, when the transfer of a session context exists, the following case may occur: A session is already transferred to a new optimal access device, but the data path of the first router is not changed immediately. As a result, the data packet is still sent to an original optimal access device. In this case, the original optimal access device may set a time threshold, and the data packet of an original service is forwarded to the new optimal access device within the time threshold so as to avoid data losses due to device switching.

In this embodiment, the information of the new optimal access device is sent to the access device of the first user or the first router, so that the optimal access device can be switched without forwarding the data packet through the second router, and the switching of the optimal access device can be implemented without using the second location server.

Figure 12:
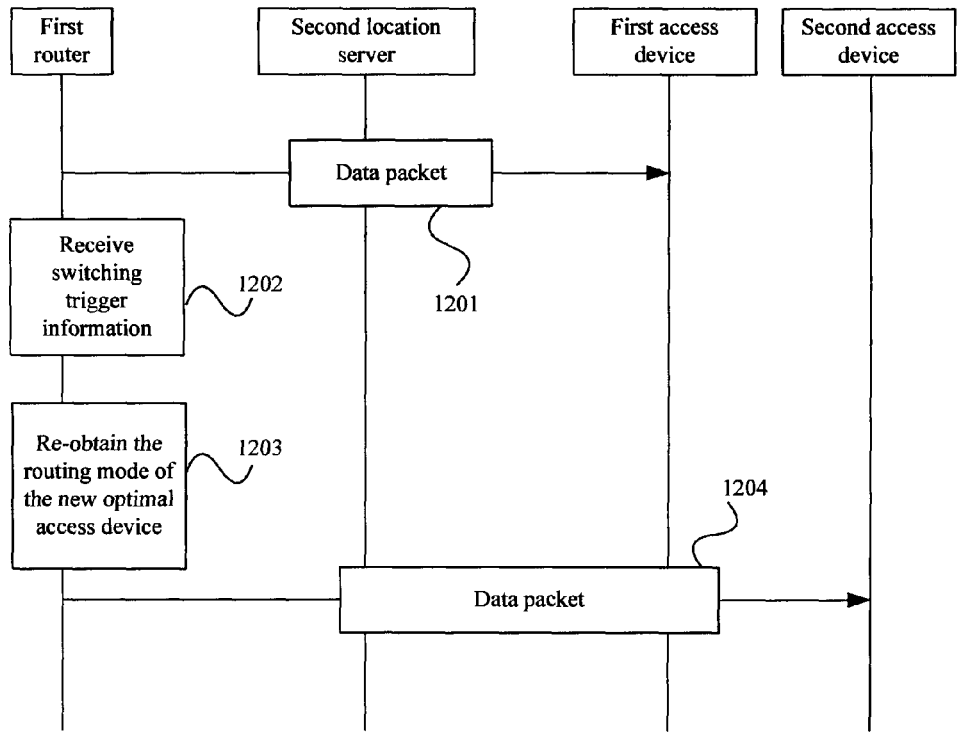
FIG. 12 is a schematic flowchart of a method according to a tenth embodiment of the present invention.

FIG. 12 is a schematic flowchart of a method according to a tenth embodiment of the present invention, where the method includes the following steps:

Step 1201 is the same as step 901, and is not further described.

Step 1202: An access device of a first user or a first router (illustrated as the first router in FIG. 12) receives switching trigger information.

For example, after the first router sends a data packet to an original optimal access device, the feedback in response to the data packet times out, or the feedback of the original optimal access device or a corresponding domain router to the first router indicates that the data packet is unreachable to the original optimal access device. The first router may maintain the state (reachable or unreachable) of each session.

Step 1203: The access device of the first user or the first router re-obtains the routing mode of a new optimal access device (a second access device). For example, the routing mode is sending a data packet directly to the optimal access device of a second user, or sending a data packet to the optimal access device of a second user through the home router of the second user.

For details, reference can be made to the embodiment shown in FIG. 4, FIG. 5, FIG. 6, or FIG. 7.

Step 1204: The access device of the first user or the first router sends the data packet to a home router of the second user or a new optimal access device of the second user (illustrated as a new optimal access device, that is, a second access device in FIG. 12).

In this embodiment, the access device of the first user or the first router receives switching trigger information, and re-selects an optimal access device. In this way, the access device of the first user or the first router may initiate switching actively.

Figure 13:
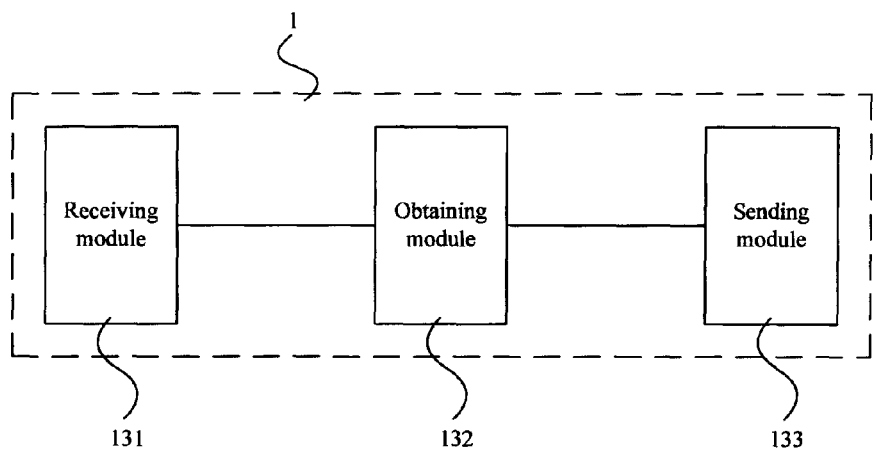
FIG. 13 is a schematic structural diagram of a system according to an eleventh embodiment of the present invention.

FIG. 13 is a schematic structural diagram of a system according to an eleventh embodiment of the present invention. The system includes a router 1, where the router 1 includes a receiving module 131, an obtaining module 132, and a sending module 133.

The receiving module 131 is configured to receive a data packet sent by an access device of a first user, where the data packet carries target device selection information including at least a user identity of a second user, and the user identity is associated with at least one access device of the second user. The obtaining module 132 is configured to obtain a routing address of an optimal access device among access devices associated with the user identity. The sending module 133 is configured to send the data packet to the optimal access device according to the routing address.

A user identity layer in this embodiment is a communication protocol stack complying with an existing OSI 7-layer reference model or a TCP/IP protocol stack or a new layer added on the basis of a protocol stack that performs similar functions. The user identity layer and a network layer are located at the same layer or the user identity layer is located between a transport layer and a network layer.

The target device selection information provided in this embodiment is the user identity of the second user or the target device selection information is the user identity of the second user and data type/session information of a current service.

Figure 14:
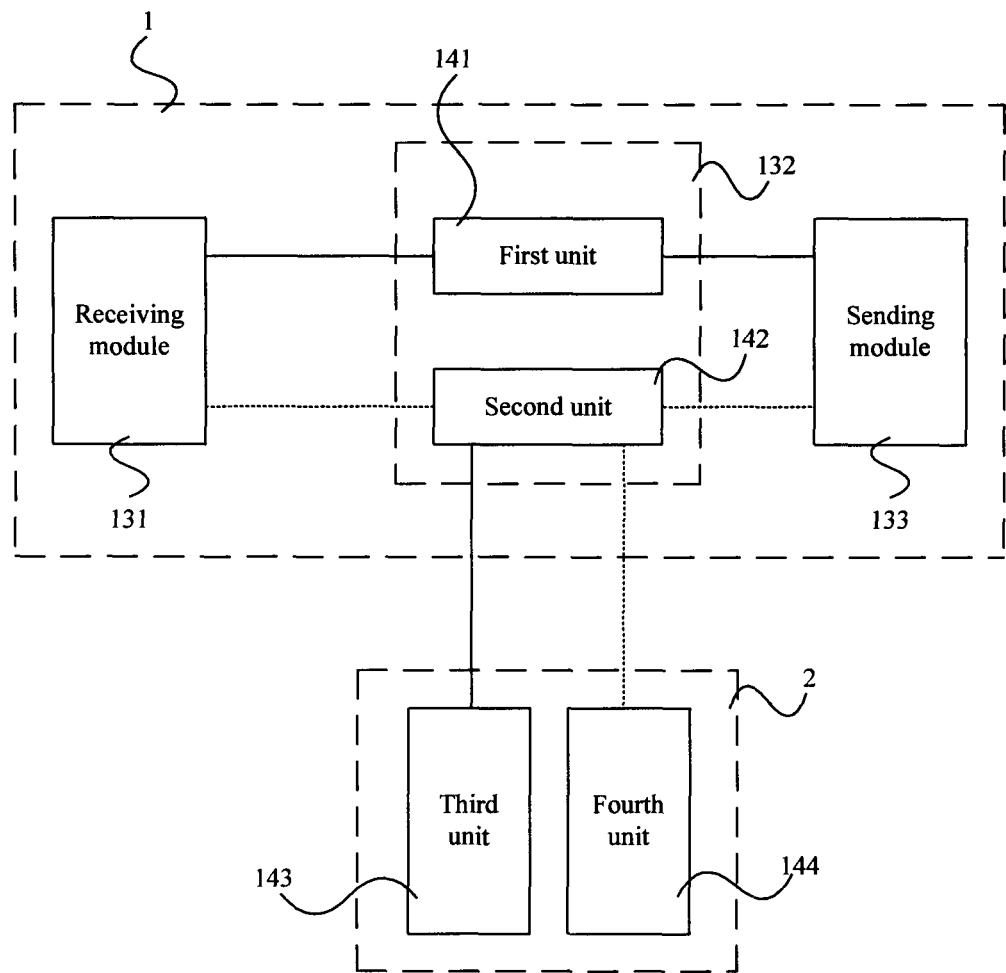
FIG. 14 is a schematic structural diagram of a system according to a twelfth embodiment of the present invention.

In this embodiment, a user identity layer is added to a protocol stack, so that user-centered communication may be implemented by using a user identity FIG. 14 is a schematic structural diagram of a system according to a twelfth embodiment of the present invention. As shown in FIG. 14, the system includes a router 1 and a location server 2, where the location server 2 is a home location server of a second user. Target device selection information is a user identity of a second user, or target device selection information is a user identity of a second user and data type/session information of a current service. An obtaining module 132 includes a first unit 141 and/or a second unit 142. The first unit 141 is configured to determine a routing address of an optimal access device corresponding to target device selection information according to a mapping relationship when the mapping relationship between target device selection information and a routing address of an optimal access device is stored, where the routing address of the optimal access device in the mapping relationship is obtained from a home location server of the second user in advance. The second unit 142 is configured to obtain the routing address of the optimal access device from the home location server of the second user when the mapping relationship between the target device selection information and the routing address of the optimal access device is not stored.

The location server 2 is configured to: receive a query request that is sent by the obtaining module and carries the target device selection information, determine the routing address of the optimal access device after receiving the query request, and return the routing address of the optimal access device to the obtaining module.

The location server 2 includes a third unit 143 or a fourth unit 144. The third unit 143 is configured to: obtain, from information stored in the third unit, context information of the second user corresponding to the user identity; when the target device selection information is a user identity, obtain the routing address of the optimal access device according to the context information of the second user; when the target device selection information is a user identity and data type/session information, obtain the routing address of the optimal access device according to the context information of the second user and the data type/session information. The fourth unit 144 is configured to send a signaling message to access devices associated with the user identity, so that the second user selects an access device after receiving the signaling message and returns a selection message; obtain, from information stored in the fourth unit, context information of the second user corresponding to the user identity, determine, according to the context information of the second user, a routing address of an access device that returns the selection message, and use the routing address of the access device that returns the selection message as the routing address of the optimal access device.

The router 1 is a home router of the second user. The location server is further configured to: when the context information of the second user is changed, obtain new context information, and determine a routing address of a new optimal access device according to the new context information and target device selection information. The location server is further configured to send the routing address of the new optimal access device to the home router of the second user when the new optimal access device is different from an original optimal access device, so that the home router of the second user updates the mapping relationship between the target device selection information and the routing address of the optimal access device and forwards a data packet to the new optimal access device according to the updated mapping relationship.

Or the router 1 is an ingress/egress domain router in a network domain accessed by an access device of a first user. The location server is further configured to receive a subscription message sent by a subscriber, where the subscriber is the access device of the second user or a network entity on a network accessed by the access device of the second user and the subscription message carries the target device selection information. The location server is further configured to: when the context information of the second user is changed, obtain the routing address of a new optimal access device that corresponds to the target device selection information; and the location server is further configured to send the routing address of the new optimal access device to the subscriber, so that the subscriber or the new optimal access device during device switching or an entity on a network accessed by the new optimal access device sends the routing address of the new optimal access device to the access device of the first user or the ingress/egress domain router in a network domain accessed by the access device of the first user, so that the access device of the first user or the ingress/egress domain router in the network domain accessed by the access device of the first user updates the mapping relationship between the target device selection information and the optimal access device and sends a data packet to the new optimal access device according to the updated mapping relationship.

Or the router 1 is an ingress/egress domain router in a network domain accessed by the access device of the first user; the location server is further configured to push, on a real-time basis, information of available access devices that are for current switching and are of the second user to an access device used currently by the second user, so that the second user selects a new optimal access device corresponding to the target device selection information from the available access devices that are for current switching and triggers device switching. The information of access devices includes one or more of the following: a device type and a device routing address; an original optimal access device or the new optimal access device sends the routing address of the new optimal access device to the access device of the first user or an ingress/egress domain router in a network domain accessed by the access device of the first user, so that the access device of the first user or the ingress/egress domain router in the network domain accessed by the access device of the first user updates the mapping relationship between the target device selection information and the optimal access device and sends a data packet to the new optimal access device according to the updated mapping relationship.

Or, the router 1 is an ingress/egress domain router in a network domain accessed by the access device of the first user; the second user or the access device of the second user selects a new optimal access device for the second user according to known information, where the known information includes one or more of the following: type of an available device for switching and device routing address; an original optimal access device or the new optimal access device sends the routing information of the new optimal access device to the access device of the first user or the ingress/egress domain router in the network domain accessed by the access device of the first user, so that the access device of the first user or the ingress/egress domain router in the network domain accessed by the access device of the first user is further configured to update the mapping relationship between the target device selection information and the optimal access device. In this way, the access device of the first user or the ingress/egress domain router in the network domain accessed by the access device of the first user sends a data packet to the new optimal access device.

Or, the router 1 is an ingress/egress domain router in a network domain accessed by the access device of the first user; the access device of the first user or the ingress/egress domain router in the network domain accessed by the access device of the first user is configured to: receive switching trigger information, and re-obtain a routing address of a new optimal access device according to the target device selection information, where the switching trigger information indicates that when the data packet is sent to an original optimal access device by the access device of the first user or the ingress/egress domain router in the network domain accessed by the access device of the first user, feedback in response to the data packet times out, or that the data packet is unreachable to the original optimal access device; the access device of the first user or the ingress/egress domain router in the network domain accessed by the access device of the first user is further configured to: update the mapping relationship between the target device selection information and the optimal access device according to a routing address of the new optimal access device, and forward a data packet to the new optimal access device according to the updated mapping relationship.

In this embodiment, a user identity layer is added to a protocol stack, so that user-centered communication can be implemented by using a user identity. In this embodiment, the switching may also be performed.

In some embodiments of the present invention, a user identity layer may be added to an existing protocol stack; a user identity at the user identity layer may be used to perform identification without using an IP address or a host identity, so as to implement user-centered communication. In some embodiments of the present invention, a data packet of a first user may be directly sent to an optimal access device of a second user, or may be forwarded to an optimal access device of a second user through a home router of the second user, so as to satisfy configuration requirements of different systems. In some embodiments of the present invention, a second location server may obtain a routing address of an optimal access device according to configuration information of the second location server or by interacting with the second user, so as to improve flexibility. In some embodiments of the present invention, a routing address of a changed new optimal access device is sent to a router, so that the switching of the optimal access device may be implemented, so as to adapt to system environment changes.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The storage medium may be any medium capable of storing program codes, such as a ROM, a RAM, a magnetic disk, and a CD-ROM.

It should be noted that the above embodiments are merely for illustrating the technical solutions of the present invention, and are not intended to limit the present invention. It is apparent that persons of ordinary skill in the art can make various modifications and variations to the technical solutions of the present invention, and such modifications and variations should be construed as falling within the spirit and the scope of the technical solutions of the present invention.

What is claimed is:

1. A method for data transmission, comprising:

receiving, by a router, a data packet sent by an access device of a first user, wherein the data packet carries target device selection information comprising at least a user identity of a second user, and the user identity is associated with at least one access device of the second user;

obtaining, by the router, a routing address of a first access device among the at least one access device associated with the user identity; and sending, by the router, the data packet to the first access device according to the routing address;

wherein the obtaining, by the router, the routing address of the first access device among the at least one access device associated with the user identity comprises one of the following:

if the router has stored a mapping relationship between the target device selection information and the routing address of the first access device, determining the routing address of the first access device corresponding to the target device selection information according to the mapping relationship, wherein the routing address of the first access device in the mapping relationship is obtained from a home location server of the second user; and if the router has not stored a mapping relationship between the target device selection information and the routing address of the first access device, obtaining the routing address of the first access device from a home location server of the second user, wherein the obtaining, by the router, the routing address of the first access device from the home location server of the second user comprises:

sending, by the router, a query request to the home location server of the second user, wherein the query request carries the target device selection information, so that the home location server of the second user determines the routing address of the first access device after receiving the query request; and receiving, by the router, the routing address of the first access device returned by the home location server of the second user, wherein the determining, by the home location server of the second user, the routing address of the first access device after receiving the query request comprises one of the following:

obtaining, by the home location server of the second user, from information stored by the home location server of the second user, context information of the second user that corresponds to the user identity in the target device selection information; if the target device selection information is a user identity, obtaining the routing address of the first access device according to the context information of the second user; or if the target device selection information is a user identity and either a data type or a session information, obtaining the routing address of the first access device according to the context information of the second user and the data type or the session information; and sending, by the home location server of the second user, a signaling message to the at least one access device associated with the user identity in the target device selection information, so that the second user selects an access device and returns a selection message after the at least one access device receives the signaling message, wherein the selection message is used to indicate the access device selected by the second user;

obtaining, by the home location server of the second user, from information stored by the home location server of the second user, the context information of the second user that corresponds to the user identity in the target device selection information, determining, according to the context information of the second user, a routing address of the access device selected by the second user as indicated in a selection message, and using the routing address of the access device selected by the second user as the routing address of the first access device, wherein the router is a home router of the second user, and wherein the method further comprises the following processes:

if the context information of the second user is changed, obtaining, by the home location server of the second user, new context information, and determining a routing address of a second access device according to the new context information and the target device selection information; and if the second access device is different from the first access device, sending, by the home location server of the second user, the routing address of the second access device to the home router of the second user, so that the home router of the second user updates a mapping relationship between the target device selection information and the routing address of the first access device and forwards the data packet to the second access device according to the updated mapping relationship.

2. The method according to claim 1, wherein the user identity is located at a user identity layer, wherein the user identity layer is a new layer in a protocol stack, and the user identity layer and a network layer are located at a same layer or the user identity layer is located between a transport layer and a network layer.

3. The method according to claim 1, wherein the target device selection information includes the user identity of the second user or the target device selection information includes the user identity of the second user and either a data type or a session information of a service data transmission.

4. The method according to claim 1, wherein the context information of the second user comprises at least one of the following: a routing address of an access device associated with the user identity, a related policy of the second user, and a surrounding environment information of the second user.

5. The method according to claim 4, further comprising at least one of the following processes:

receiving, by the home location server of the second user, a registration or update message sent by the access device associated with the user identity or an entity on the network accessed by the access device associated with the user identity, wherein the registration or update message carries at least the routing address of the access device associated with the user identity, and storing, by the home location server of the second user, at least the routing address of the access device associated with the user identity;

receiving, by the home location server of the second user, a registration or update message that is sent by the access device of the second user or a network entity on the network accessed by the access device of the second user when the second user formulates or updates the related policy of the second user, wherein the registration or update message carries the related policy of the second user, and storing, by the home location server of the second user, the related policy of the second user; and obtaining, by the home location server of the second user, the surrounding environment information of the second user indirectly through the routing address of the access device associated with the user identity, or obtaining, by the home location server of the second user, the surrounding environment information of the second user; and storing, by the home location server of the second user, the surrounding environment information of the second user.

6. The method according to claim 1, wherein the sending, by the home location server of the second user, the routing address of the second access device to the home router of the second user comprises:

receiving, by the home location server of the second user, an activation state report that is periodically sent by the home router of the second user, wherein the activation state report is used to indicate whether the target device selection information is in an active state; and sending, by the home location server of the second user to the home router of the second user, the routing address of the second access device that corresponds to the target device selection information in the active state indicated in the activation state report.

7. The method according to claim 1, wherein the sending, by the home location server of the second user, the routing address of the second access device to the home router of the second user comprises:

receiving, by the home location server of the second user, a subscription message sent by the home router of the second user, wherein the subscription message is used to indicate whether a routing address of a third access device that corresponds to the target device selection information needs to be notified each time when the first access device is changed; and sending, by the home location server of the second user to the home router of the second user, the routing address of the third access device that corresponds to the target device selection information that needs to be notified as indicated in the subscription message.

8. The method according to claim 1, wherein the router is an ingress/egress domain router in a network domain accessed by the access device of the first user, and the method further comprises:

receiving, by the home location server of the second user, a subscription message sent by a subscriber, wherein the subscriber is one of the at least one access devices of the second user or a network entity on a network accessed by one of the at least one access devices of the second user, wherein the subscription message carries the target device selection information;

when the context information of the second user is changed, obtaining, by the home location server of the second user, a routing address of a third access device that corresponds to the target device selection information; and sending, by the home location server of the second user, the routing address of the third access device to the subscriber, to enable the subscriber or the third access device during device switching or an entity on a network accessed by the third access device to send the routing address of the third access device to the access device of the first user or the ingress/egress domain router in the network domain accessed by the access device of the first user, so that the access device of the first user or the ingress/egress domain router in the network domain accessed by the access device of the first user updates the mapping relationship between the target device selection information and the first access device, and sends a data packet to the third access device according to the updated mapping relationship.

9. The method according to claim 1, wherein the first access device and the second access device are logical devices and are physically located on a same physical device or located on different physical devices, and wherein if the first access device and the second access device are located on different physical devices, the method further comprises:

triggering, by the home location server of the second user, a session transfer from the first access device to the second access device.

10. The method according to claim 1, wherein the router is an ingress/egress domain router in a network domain accessed by the access device of the first user, and the method further comprises:

pushing, by the home location server of the second user on a real-time basis, information of available access devices that are for switching and are associated with the second user to an access device currently used by the second user, so that the second user selects a third access device corresponding to the target device selection information from the available access devices that are for switching and are associated with the second user and triggers device switching, wherein the information of the available access devices comprises at least one of a device type and a device routing address; and sending, by the first access device or the third access device, a routing address of the third access device to the access device of the first user or the ingress/egress domain router in the network domain accessed by the access device of the first user, so that the access device of the first user or the ingress/egress domain router in the network domain accessed by the access device of the first user updates the mapping relationship between the target device selection information and the first access device and sends a data packet to the third access device according to the updated mapping relationship.

11. The method according to claim 1, wherein the router is an ingress/egress domain router in a network domain accessed by the access device of the first user, and the method further comprises:

selecting, by the second user, a third access device for the second user according to known information, and triggering device switching, wherein the known information comprises one or more of the following: type of an available device for switching and device routing address; and sending, by the first access device or the third access device, routing information of the third access device to the access device of the first user or the ingress/egress domain router in the network domain accessed by the access device of the first user, so that the access device of the first user or the ingress/egress domain router in the network domain accessed by the access device of the first user updates the mapping relationship between the target device selection information and the third access device and sends a data packet to the third access device.

12. The method according to claim 1, wherein the router is an ingress/egress domain router in a network domain accessed by the access device of the first user, and the method further comprises:

receiving, by the access device of the first user or the ingress/egress domain router in the network domain accessed by the access device of the first user, switching trigger information, and obtaining a routing address of a third access device according to the target device selection information, wherein the switching trigger information indicates that after the access device of the first user or the ingress/egress domain router in the network domain accessed by the access device of the first user sends a data packet to the first access device, feedback in response to the data packet timing out, or an indication that the data packet cannot reach the first access device; and updating, by the access device of the first user or the ingress/egress domain router in the network domain accessed by the access device of the first user, the mapping relationship between the target device selection information and the first access device according to the routing address of the third access device, and sending a data packet to the third access device according to the updated mapping relationship.

13. The method according to claim 1, wherein the routing address of the first access device is a globally routable address of the first access device or a routing address of an ingress/egress domain router in a network domain accessed by the first access device.

14. A system for data transmission, comprising a router, wherein the router comprises:

a receiving module, configured to receive a data packet sent by an access device of a first user, wherein the data packet carries target device selection information comprising at least a user identity of a second user, and the user identity is associated with at least one access device of the second user;

an obtaining module, configured to obtain a routing address of a first access device among the at least one access device associated with the user identity; and a sending module, configured to send the data packet to the first access device according to the routing address, wherein the obtaining module comprises at least one of a first unit and a second unit, wherein the first unit is configured to, when a mapping relationship between the target device selection information and the routing address of the first access device is stored, determine the routing address of the first access device corresponding to the target device selection information according to the mapping relationship, wherein the routing address of the first access device in the mapping relationship is obtained from a home location server of the second user, wherein the second unit is configured to obtain the routing address of the first access device from the home location server of the second user when a mapping relationship between the target device selection information and the routing address of the first access device is not stored, wherein the system further comprises a location server configured to receive a query request that is sent by the obtaining module and carries the target device selection information, to determine the routing address of the first access device after receiving the query request, and to return the routing address of the first access device to the obtaining module, wherein the router is a home router of the second user, wherein the home location server is further configured to when context information of the second user is changed, obtain new context information, and determine a routing address of a second access device according to the new context information and the target device selection information, and wherein the home location server is further configured to send the routing address of the second access device to the home router of the second user when the second access device is different from the first access device so that the home router of the second user updates the mapping relationship between the target device selection information and the routing address of the first access device and forwards a data packet to the second access device according to the updated mapping relationship.

15. The system according to claim 14, wherein the user identity is located at a user identity layer, and wherein the user identity layer is a new layer in a protocol stack, and the user identity layer and a network layer are located at a same layer or the user identity layer is located between a transport layer and a network layer.

16. The system according to claim 14, wherein the target device selection information includes the user identity of the second user or the target device selection information includes the user identity of the second user and either a data type or a session information of a service data transmission.

17. The system according to claim 14,
wherein the home location server comprises at least one of a third unit and a fourth unit,
wherein the third unit is configured to: from information stored by the home location server, obtain context information of the second user that corresponds to the user identity in the target device selection information; when the target device selection information is the user identity, obtain the routing address of the first access device according to the context information of the second user; when the target device selection information is the user identity and either the data type or the session information, obtain the routing address of the first access device according to the context information of the second user and either the data type or the session information, and
wherein the fourth unit is configured to send a signaling message to the at least one access device associated with the user identity in the target device selection information, so that the second user selects an access device and returns a selection message after the at least one access device receives the signaling message, wherein the selection message is used to indicate the access device selected by the second user; from information stored by the home location server, obtain context information of the second user corresponding to the user identity in the target device selection information, determine, according to the context information of the second user, the routing address of the access device selected by the second user as indicated in the selection message, and use the routing address of the access device selected by the second user as the routing address of the first access device.

18. The system according to claim 14,
wherein the router is an ingress/egress domain router in a network domain accessed by the access device of the first user,
wherein the home location server is further configured to push, on a real-time basis, information of available access devices that are for switching and are associated with the second user to an access device currently used by the second user, so that the second user selects a third access device corresponding to the target device selection information from the available access devices that are for switching and are associated with the second user and triggers device switching, wherein the information of the available access devices comprises at least one of a device type and a device routing address; and
the first access device or the third access device sends the routing address of the third access device to the access device of the first user or the ingress/egress domain router in the network domain accessed by the access device of the first user, so that the access device of the first user or the ingress/egress domain router in the network domain accessed by the access device of the first user updates the mapping relationship between the target device selection information and the first access device and sends a data packet to the third access device according to the updated mapping relationship.

19. The system according to claim 14,
wherein the router is an ingress/egress domain router in a network domain accessed by the access device of the first user,
wherein the second user or the access device of the second user selects a third access device for the second user according to known information, and triggers device switching, wherein the known information comprises at least one of a type of an available device for switching and a device routing address, and
wherein the first access device or the third access device sends routing information of the third access device to the access device of the first user or the ingress/egress domain router in the network domain accessed by the access device of the first user, so that the access device of the first user or the ingress/egress domain router in the network domain accessed by the access device of the first user updates the mapping relationship between the target device selection information and the first access device and sends a data packet to the third access device.

20. The system according to claim 14,
wherein the router is an ingress/egress domain router in a network domain accessed by the access device of the first user,
wherein the access device of the first user or the ingress/egress domain router in the network domain accessed by the access device of the first user is further configured to: after receiving switching trigger information, obtain a routing address of a third access device according to the target device selection information, wherein the switching trigger information indicates that after the access device of the first user or the ingress/egress domain router in the network domain accessed by the access device of the first user sends a data packet to the first access device, feedback in response to the data packet times out, or that the data packet is unreachable to the first access device, and wherein the access device of the first user or the ingress/egress domain router in the network domain accessed by the access device of the first user is further configured to: update the mapping relationship between the target device selection information and the first access device according to the routing address of the third access device, and send a data packet to the third access device according to the updated mapping relationship.

21. A system for data transmission, comprising a router, wherein the router comprises:

a receiving module, configured to receive a data packet sent by an access device of a first user, wherein the data packet carries target device selection information comprising at least a user identity of a second user, and the user identity is associated with at least one access device of the second user;

an obtaining module, configured to obtain a routing address of a first access device among the at least one access device associated with the user identity; and a sending module, configured to send the data packet to the first access device according to the routing address, wherein the obtaining module comprises at least one of a first unit and a second unit, wherein the first unit is configured to, when a mapping relationship between the target device selection information and the routing address of the first access device is stored, determine the routing address of the first access device corresponding to the target device selection information according to the mapping relationship, wherein the routing address of the first access device in the mapping relationship is obtained from a home location server of the second user, wherein the second unit is configured to obtain the routing address of the first access device from a home location server of the second user when a mapping relationship between the target device selection information and the routing address of the first access device is not stored, wherein the system further comprises a location server configured to receive a query request that is sent by the obtaining module and carries the target device selection information, to determine the routing address of the first access device after receiving the query request, and to return the routing address of the first access device to the obtaining module, wherein the router is an ingress/egress domain router in a network domain accessed by the access device of the first user, wherein the home location server is further configured to receive a subscription message sent by a subscriber, wherein the subscriber is the access device of the second user or a network entity on a network accessed by the access device of the second user, and the subscription message carries the target device selection information, wherein the home location server is further configured to obtain a routing address of a second access device that corresponds to the target device selection information when context information of the second user is changed, and wherein the home location server is further configured to send the routing address of the second access device to the subscriber, to enable the subscriber or the second access device during device switching or an entity on a network accessed by the second access device to send the routing address of the second access device to the access device of the first user or the ingress/egress domain router in the network domain accessed by the access device of the first user, so that the access device of the first user or the ingress/egress domain router in the network domain accessed by the access device of the first user updates the mapping relationship between the target device selection information and the first access device, and sends a data packet to the second access device according to the updated mapping relationship.

* * * * *